(12) United States Patent
Auer et al.

(10) Patent No.: US 8,566,814 B2
(45) Date of Patent: Oct. 22, 2013

(54) TRANSPORTING OBJECT PACKETS IN A NESTED SYSTEM LANDSCAPE

(75) Inventors: Ulrich Auer, Hockenheim (DE); Ralf Belger, Ludwigshafen (DE); Ralf-Juergen Hauck, Heidelberg (DE); Hans-Juergen Hennrich, Gaiberg (DE)

(73) Assignee: SAP AG, Walldorf (DE)

( * ) Notice: Subject to any disclaimer, the term of this patent is extended or adjusted under 35 U.S.C. 154(b) by 918 days.

(21) Appl. No.: 12/646,972

(22) Filed: Dec. 24, 2009

(65) Prior Publication Data

US 2011/0158242 A1  Jun. 30, 2011

(51) Int. Cl.
*G06F 9/45* (2006.01)

(52) U.S. Cl.
USPC ............ 717/168; 717/172; 717/174; 717/177

(58) Field of Classification Search
USPC .................................. 717/168, 172, 174, 177
See application file for complete search history.

(56) References Cited

U.S. PATENT DOCUMENTS

| | | | |
|---|---|---|---|
| 8,122,101 B2 * | 2/2012 | Schulz et al. ................ 717/176 |
| 2008/0162619 A1 | 7/2008 | Schulz et al. |
| 2008/0162620 A1 | 7/2008 | Schulz et al. |
| 2008/0162621 A1 | 7/2008 | Schulz et al. |
| 2008/0163200 A1 | 7/2008 | Schulz et al. |

\* cited by examiner

*Primary Examiner* — Qamrun Nahar (57) ABSTRACT

Described are methods and systems related to transporting one or more object packets present in a nested hierarchy of one or more system landscapes. The object packets available for transporting from source systems to target systems present in the nested hierarchy of the system landscapes is identified. A transport request is generate for a collection of object packets of each source system in the nested hierarchy of the system landscapes. The transport requests are aggregated to render a nested transport collection. The nested transport collection is transported within the nested hierarchy of the system landscapes. The nested transport collection is deployed to assign the transport requests present in the nested transport collection to the target systems present in the nested hierarchy of the system landscapes.

20 Claims, 6 Drawing Sheets

TRANSPORTING OBJECT PACKETS IN A NESTED SYSTEM LANDSCAPE

TECHNICAL FIELD

Embodiments of the invention generally relate to computer systems, and more particularly to methods and systems for transporting object packets.

BACKGROUND

Software systems are usually not standalone; rather they are a part of a network of systems also called system landscapes. Various factors contribute to the complexity of these system landscapes. For instance, different applications that are running on different systems may be interconnected to each other by business processes, constituting vertical complexity. Applications that are installed more than once in a system, run independent of processes being executed in the system. Any new result of such processes may have to be transported across all applications, constituting horizontal complexity. When the output data is proprietary, coming from various servers, the format may not be uniform, constituting server complexity. To make these complex system landscapes controllable, a hierarchical landscaping of systems is required. However, in an already existing organizational hierarchy, the hierarchical landscaping of systems may incur other complexities including multi-level vertical and horizontal complexities. The hierarchy may also include heterogeneous system landscapes, with heterogeneous systems. The output data of each of the heterogeneous systems are unique in nature. The hierarchy does not support transportation of such unique output data to other system.

Hence, there is a need for a method to transport information in a hierarchical environment, thereby avoiding complexities incurred during transportation.

SUMMARY

Embodiments of the invention are generally directed to methods and system for transporting one or more object packets present in a nested hierarchy of one or more system landscapes. The object packets available for transporting from source systems to target systems present in the nested hierarchy of the system landscapes is identified. A transport request is generated for a collection of object packets of each source system in the nested hierarchy. The transport requests are aggregated to render nested transport collections. The nested transport collections are transported within the nested hierarchy. The nested transport collections are further deployed to assign the transport requests present in the nested transport collections to the target systems present in the nested hierarchy of the system landscapes.

In an embodiment, the object packets available for transporting from the source systems to the target systems at a first level of the nested hierarchy are identified. A first level transport request is generated for a collection of object packets of each source system present in the first level of the nested hierarchy. The first level transport requests generated for the source systems at the first level of the nested hierarchy are aggregated to render a second level transport collection at a second level of the nested hierarchy. The second level transport collections rendered at the second level of the nested hierarchy are aggregated to generate a third level transport collection at a third level of the nested hierarchy. Similarly, $n^{th}$ level transport collections rendered at an $n^{th}$ level of the nested hierarchy are aggregated to generate an n+1 level transport collection at an n+1 level of the nested hierarchy.

Further, the n+1 level transport collection is transported within the n+1 level of the nested hierarchy. The n+1 transport collection is deployed at the $n^{th}$ level of the nested hierarchy to assign the $n^{th}$ level transport collections present in the n+1 transport collection to corresponding hierarchies present at the $n^{th}$ level of the nested hierarchy. Similarly, the third level transport collection is deployed at the second level of the nested hierarchy, to assign the second level transport collections present in the third level transport collection to the second level of the nested hierarchy. The second level transport collections are deployed at the first level of the nested hierarchy to assign the first level transport requests present in the second level transport collection to the target systems in the first level of the nested hierarchy.

In another embodiment, at the n+1 level of the nested hierarchy, if one or more n+1 level transport collections are already present, the n+2 level transport collection may be aggregated with the n+1 level transport collection to generate an aggregated n+2 level transport collection. Further the n+1 level transport collections aggregated with an n+2 level transport collection are deployed at the n+1 level of the nested hierarchy.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of the invention are generally directed to methods and systems related to transporting one or more object packets present in a nested hierarchy of one or more system landscapes. A nested hierarchy of the system landscapes includes one or more of hierarchies of one or more system landscapes. A hierarchy of system landscapes includes a collection or an arrangement of one or more system landscapes. Each system landscape includes one or more source systems and corresponding one or more target systems. The source systems present in the hierarchy may include a collection of homogeneous and/or heterogeneous data that is required by the target systems present in the same hierarchy or a different hierarchy, to execute necessary processes. The homogeneous or heterogeneous data may be described as object packets. In an embodiment, transporting the object packets present in the nested hierarchy of the system landscapes involves transporting the object packets from the source systems of a hierarchy of system landscape to the target systems of the hierarchy of system landscape. In another embodiment, transporting the object packets present in the hierarchy of system landscapes involves transporting object packets from the source systems of a first hierarchy of system landscapes to the target systems of a second hierarchy of system landscapes. The first and the second hierarchy of system landscapes are included in the nested hierarchy of the system landscapes.

The target systems that receive the object packets are present in the hierarchy of system landscapes whose structure is similar to the hierarchy of system landscapes that include the source systems that transport the object packets. The structure of a hierarchy of system landscapes may be described as an arrangement of the source systems and the target systems of the system landscapes. The object packets available for transporting from the source systems in the hierarchy of system landscapes to the target systems present in a nested hierarchy of the system landscapes are identified. A transport request is generated for a collection of object packets of each source system in the nested hierarchy of the system landscapes. The transport requests are aggregated to render a transport collection. The transport collection is transported to the target systems in the nested hierarchy of the system landscapes. The transport collection is further deployed to assign the transport requests present in the transport collection to one or more corresponding target systems present in the nested hierarchy of the system landscapes.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
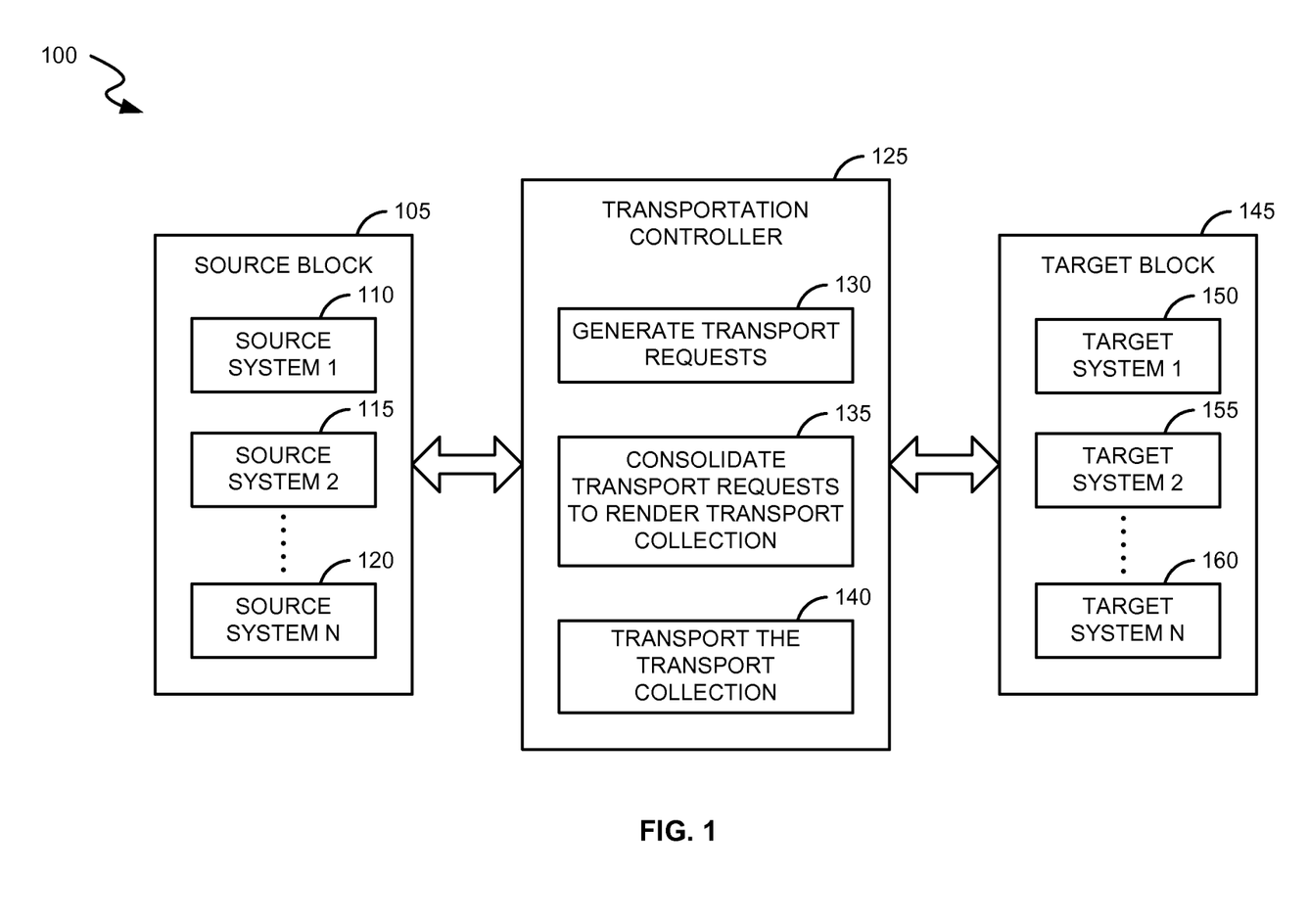
FIG. 1 is a block diagram providing a conceptual illustration of an overall method of transporting one or more object packets present in a nested hierarchy of one or more system landscapes, according to an embodiment of the invention.

FIG. 1 is a block diagram providing a conceptual illustration of an overall method of transporting one or more object packets present in a nested hierarchy of one or more system landscapes, according to an embodiment of the invention. A source system may be described as a system that executes one or more processes to render an output data. For instance, a source system may be an analysis system that executes a development process for analyzing a report and render output data as a result. A target system may be described as a system that executes one or more processes subsequent to the processes executed by the source system, to render a subsequent output data. In an embodiment, a source system has one or more corresponding target systems. In such cases, the output data of the source system may be required by the corresponding target system for further processing. Hence, the output data of the source system has to be transported to the corresponding target system for further processing.

In an embodiment, a system landscape may include a development system, a quality assurance system, and a production system. An output of the development system may be transported to the quality assurance system and the production system. The development system may include one or more source systems, and the quality assurance system and production system may each include one or more target systems. Many such system landscapes put together form a hierarchy of system landscapes. A hierarchy of system landscapes may include system landscapes supporting various processes. For instance, a hierarchy of system landscapes may include a business application landscape, a report creation system landscape, a report analyzing system landscape, a resource planning system landscape, and the like. The output data of each such system may be unique, thus making the collection of the output data of all the systems heterogeneous. A plurality of the hierarchy of system landscapes is described as a nested hierarchy of the system of landscapes.

The output data available in the source system is described as object packet. An object packet is a collection of output data of a source system, and output data from various applications that may be associated with a source system. The object packets may also include development results of each source system (e.g., a development system). A development result may be described as a collection of data that is resulting for a development process executed on the source system. The output data of the source system may be in a particular file format depending upon a type of output data. For instance, the output data of report analyzing system may have a particular file format. Files may represent a collection of output data of a same format, for instance, application component files, service component files and the like. Thus the object packet represents a file format of the type of output data included in it. For instance, if the output data is of a document type (e.g., Microsoft® Word), the file format of the output data may be of the type ".doc". Thus, the object packet representing such a file format may also be of the type ".doc".

Transporting object packets from a source system to a target system includes transporting object packets from a source system where the object packets represent the output of a process executed by the source system. For instance, a process integration (PI) system landscape may include a process integration development system, a process integration quality assurance system and a process integration production system. The output data of PI development system is transported to the PI quality assurance system and further to the PI production system. A hierarchical system may include many such homogeneous and/or heterogeneous system landscapes. Block diagram 100 illustrates the overall method involved in transporting object packets from the source system (e.g., development system) of each of such system landscapes to the target system (e.g., quality testing system and/or production system).

The object packets may be transported from one or more source systems present in a hierarchy of system landscapes to one or more corresponding target systems present in the same hierarchy of system landscapes. In an embodiment, transporting object packets present in the hierarchy of system landscapes involves transporting object packets from source systems of a first hierarchy of system landscapes to corresponding target systems of a second hierarchy of system landscapes. The first and the second hierarchy of system landscapes are included in the nested hierarchy of the system landscapes. The target systems that receive the object packets are present in the hierarchy of system landscapes whose structure is similar to the hierarchy of system landscapes that include the source systems that transport the object packets.

Source systems and target systems of the system landscapes may be included in source block 105 and target block 145 respectively. A hierarchy of system landscapes includes one or more of such source blocks and target blocks. A nested hierarchy of the system landscapes includes one or more of such hierarchies. Source block 105 includes a group of one or more source systems, "source system 1" 110, "source system 2" 115, "source system n" 120, and the like. Each of the source systems (e.g., 110, 115, and 120) is operable to execute a specific process to render an output data for the process. The output data is represented by object packets. Target block 145 includes a group of one or more target systems corresponding to the source systems in source block 105, including "target system 1" 150, "target system 2" 155, "target system 3" 160 and the like. Each of the target systems (e.g., 150, 155, and 160) is operable to execute a process subsequent to the process executed at the corresponding source system, and render a subsequent output data for the subsequent process. Transportation controller 125 is configured to facilitate transporting the object packets from source block 105 to target block 145.

To transport the output data from the source systems present in source block 105 to the target systems present in target block 145, transportation controller 125 identifies the object packets that are available for transporting from each source system (e.g., 110, 115, and 120) to the target system (e.g., 150, 155, and 160). Transportation controller 125 identifies a collection of one or more object packets available at each source system. At 130, transportation controller 125 generates a transport request for each collection of object packets available at each source system present in source block 105 of the hierarchy of system landscapes. A transport request represents a collection of object packets available at a source system, for transporting to the target systems. For instance, for the collection of object packets available at source system 110, a first transport request is generated by transportation controller 125. Similarly, for the collection of object packets available at source system 115, a second transport request is generated and for the collection of object packets available at source system 120, an $n^{th}$ transport request is generated by transportation controller 125. Each transport request represents a format of a type of output data present in the object packets included in the transport request. For instance, if the object packet represents a file format of a type ".doc", the transport request including such an object packet also represents a file format of a type ".doc". In an embodiment, the collection of output data present in the object packet may be grouped to create the transport request. In another embodiment, the transport request is persisted as a file.

At 135, transportation controller 125 aggregates the transport requests available at each source system (e.g., 110, 115 and 120). Aggregating the transport requests includes collecting the transport requests for each source system. For instance, the first transport request, the second transport request and the $n^{th}$ transport request generated at source systems 110, 115 and 120 respectively are aggregated by transportation controller 125, to create a nested transport collection. The nested transport collection represents one or more transport collections rendered at one or more different levels of the nested hierarchy. The nested transport collection is rendered in a hierarchy identical to the nested hierarchy of the system landscapes. In other words, the nesting of the nested transport collection is similar to the nesting of the hierarchies of the system landscape. The transport collection represents a collection of transport requests available at all the source systems present in source block 105. For instance, transport collection for system block 105 includes an aggregation of the first transport request generated for source system 110, the second transport request generated for source system 115, and the $n^{th}$ transport request generated for source system 120. The transport collection represents a format of a type of object packets present in the transport requests included in the transport collection.

The nested transport collection is transported within the nested hierarchy. For instance, at 140, transportation controller 125 transports the transport collection rendered for the source systems in source block 105 to the corresponding target systems in target block 145. In an embodiment, transportation controller 125 includes an index that stores a transport directory including an identity of the source systems and the corresponding target systems. For instance, for source system 110, the transport directory includes an identity of source system 110, with an address "AAAS1", identity of source system 115, with an address "AAAS2", and identity of source system 120, with an address "AAASn". Similarly for target system 150, the transport directory includes an identity of target system 150, with an address "AAAT1", identity of source system 155, with an address "AAAT2", and identity of target system 160, with an address "AAATn". The index recognizes a corresponding target system that is associated with a source system by mapping the addresses of the source system and the target system. The identity facilitates in identifying a corresponding target system for every source system. Based upon the transport directory, transportation controller 125 transports the transport collection to corresponding target systems. In an embodiment, the transport collection is persisted.

Transportation controller 125 is operable for deploying the nested transport collection to assign the transport requests present in the nested transport collection to target block 145. Deploying the nested transport collection may include importing transport collections present in the nested transport collection, extracting the transport requests present in each transport collection, identifying the source systems associated with each transport request, identifying the object packets available in each transport request, and assigning the object packets of each source system to a corresponding target system. Transportation controller 125 aggregates the transport collections from all the hierarchies of system landscapes present in the nested hierarchy of the system landscapes and transport the aggregated transport collections to one or more corresponding hierarchies of system landscapes.

The transport collection may be transported to multiple hierarchies of system landscapes, having multiple levels of nested hierarchy, by recursively aggregating the transport collections at each level of nested hierarchy. In an embodiment, the object packets available for transporting from the source systems to the target systems at a first level of the nested hierarchy are identified. A first level transport request is generated for a collection of object packets of each source system present in the first level of the nested hierarchy. The first level transport requests generated for the source systems at the first level of the nested hierarchy are aggregated to render a second level transport collection at a second level of the nested hierarchy. The second level transport collections rendered at the second level of the nested hierarchy are aggregated to generate a third level transport collection at a third level of the nested hierarchy. Similarly, $n^{th}$ level transport collections rendered at an $n^{th}$ level of the nested hierarchy are aggregated to generate an n+1 level transport collection at an n+1 level of the nested hierarchy.

Further, the n+1 level transport collection is transported within the n+1 level of the nested hierarchy. The n+1 transport collection is deployed at the $n^{th}$ level of the nested hierarchy to assign the $n^{th}$ level transport collections present in the n+1 transport collection to corresponding hierarchies present the $n^{th}$ level of the nested hierarchy. Similarly, the third level transport collection is deployed at the third level of the nested hierarchy, to assign the second level transport collections to the second level of the nested hierarchy. The second level transport collections are deployed at the second level of the nested hierarchy to assign the first level transport requests to the target systems in the first level of the nested hierarchy.

In an embodiment, a transport collection rendered for any source block present in the hierarchy of system landscapes can be transported to one or more corresponding target blocks present in the same hierarchy of system landscapes, or to one or more target blocks present in another hierarchy of system landscape of the nested hierarchy of the system landscapes.

Figure 2A:
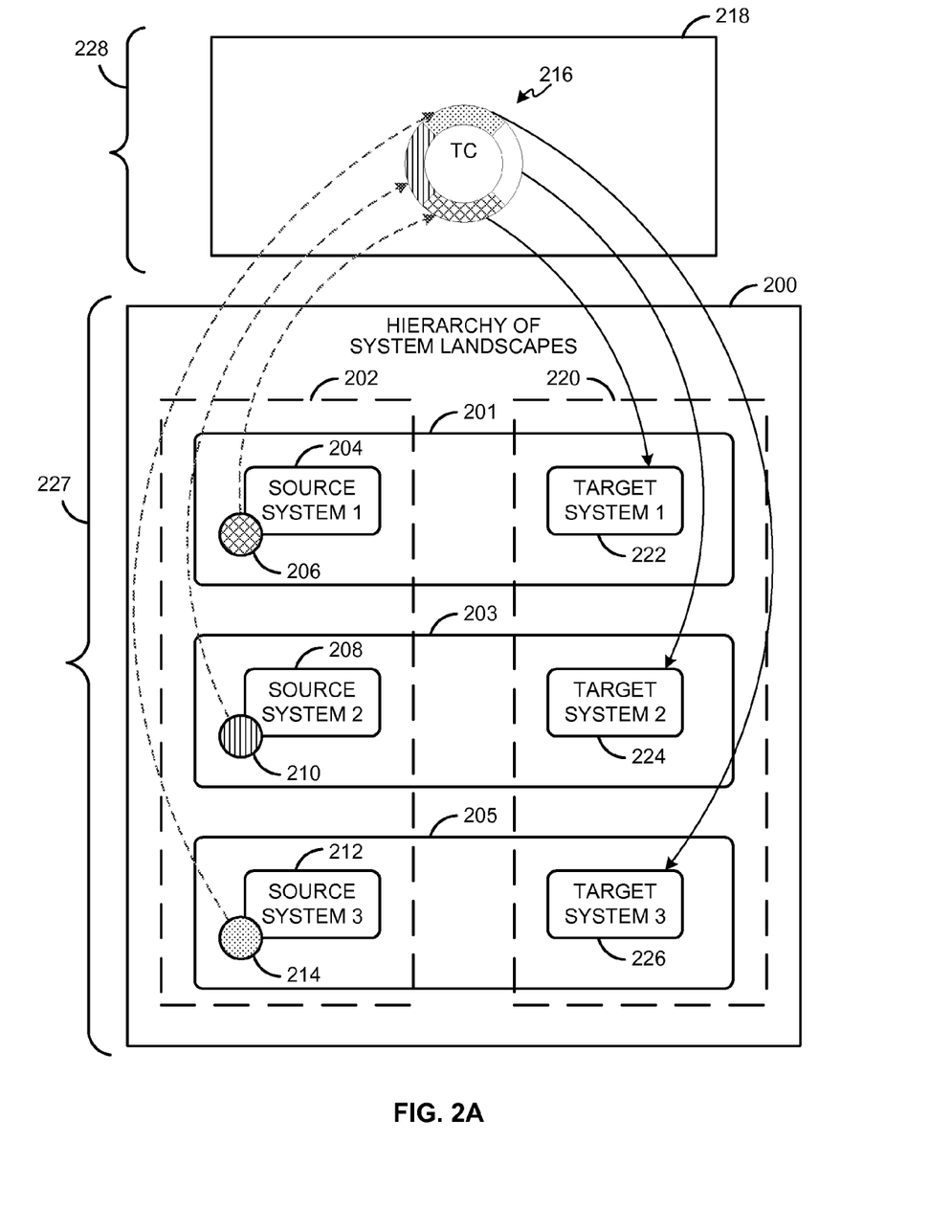
FIG. 2A is a block diagram illustrating an exemplary process for transporting one or more object packets present in a nested hierarchy of one or more system landscapes, according to an embodiment of the invention.

FIG. 2A is a block diagram illustrating an exemplary process for transporting one or more object packets present in a nested hierarchy of one or more system landscapes, according to an embodiment of the invention. FIG. 2A illustrates a two-level nested hierarchy for transporting object packets present in a hierarchy of system landscapes. A first level 227 includes one hierarchy of system landscapes, for e.g. hierarchy of system landscapes 200. Hierarchy of system landscapes 200 includes system landscapes 201, 203 and 205. Each of the system landscapes include source systems and target systems. For instance, system landscapes 201, 203 and 205 include "source system 1" 204, "source system 2" 208, and "source system 3" 212 as source systems and "target system 1" 222, "target system 2" 224, and "target system 3" 226 as target systems. The source systems may be contained in source block 202 and the target systems may be contained in target block 220. Transportation controller 218 is operable for transporting object packets from source block 202 to target block 220. Transportation controller 218 identifies the object packets available for transporting from each of the source systems 204, 208 and 212, to the corresponding target systems 222, 224 and 226 respectively. Transportation controller 218 generates first level transport requests 206, 210 and 214 respectively for each of the source systems 204, 208 and 212.

At second level 228, transportation controller 218 aggregates first level transport requests 206, 210 and 214 to render second level transport collection 216. Transportation controller 218 transports second level transport collection 216 to target block 220, to deploy second level transport collection 216 at respective target systems (for e.g. 222, 224, and 226).

Figure 2B:
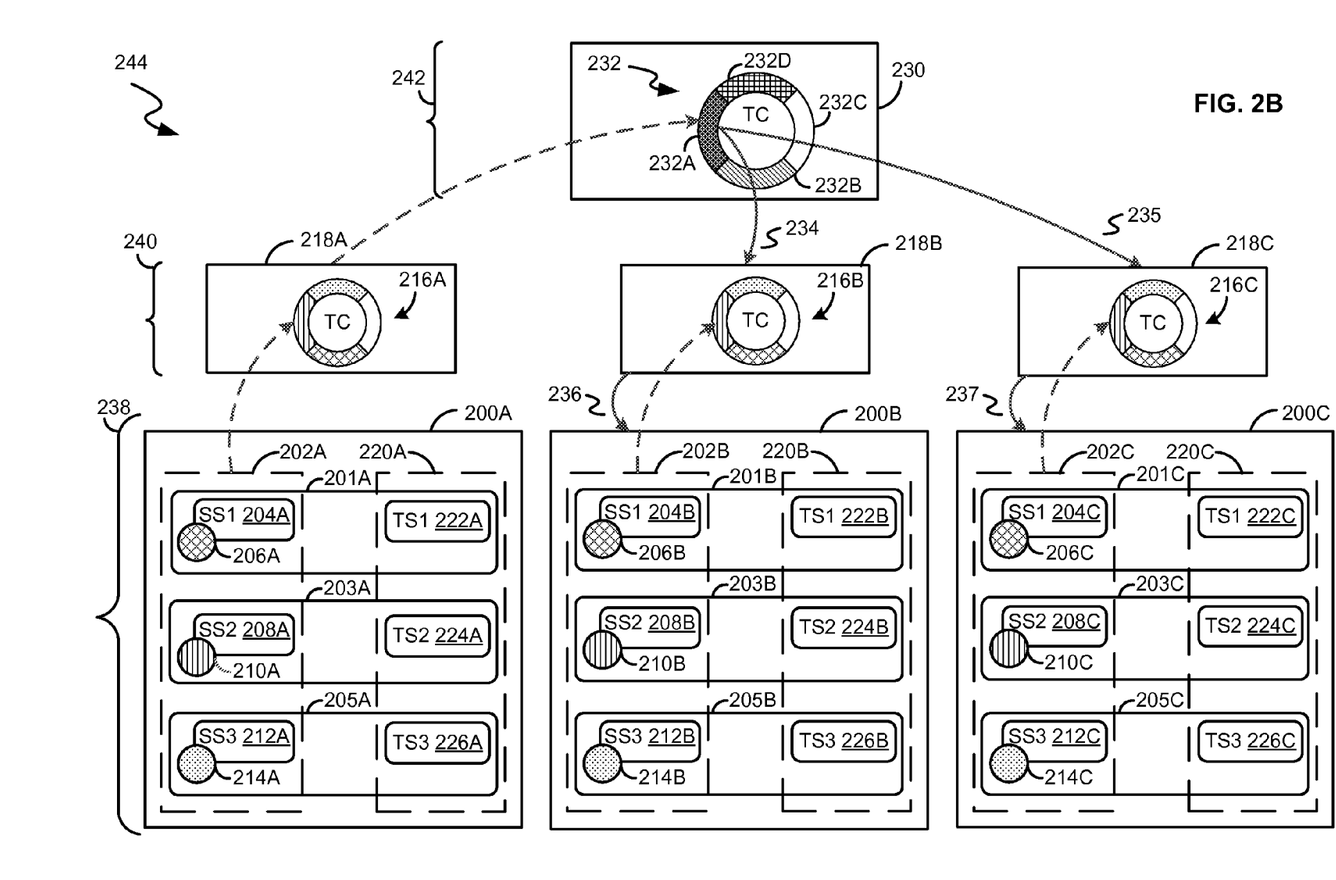
FIG. 2B is a block diagram illustrating an exemplary process for transporting one or more object packets present in one or more hierarchies of one or more system landscapes, included in a nested hierarchy of the system landscapes, according to an embodiment of the invention.

FIG. 2B illustrates an exemplary process for transporting one or more object packets present in one or more hierarchies of one or more system landscapes, present in a nested hierarchy of the system landscapes, according to an embodiment of the invention. FIG. 2B illustrates a three-level nested hierarchy for transporting object packets present in multiple hierarchies of system landscapes. At a first level, the object packets available for transporting from the source systems to the target systems are identified. A first level transport request is generated for a collection of object packets of each source system present in the first level of the nested hierarchy. The first level transport request is generated in a hierarchy that is identical to the nested hierarchy of the system landscapes. The first level transport requests generated for all the source systems at the first level of the nested hierarchy are aggregated to render a second level transport collection at a second level of the nested hierarchy. One or more such second level transport collections rendered at the second level of the nested hierarchy are aggregated to generate third level transport collection at a third level of the nested hierarchy.

The third level transport collection is transported to the second level of the nested hierarchy. The third level transport collection is deployed at the second level of the nested hierarchy, to assign the second level transport collections present in the third level transport collection to the corresponding hierarchies present in the nested hierarchy of system landscapes. Further, the second level transport collections are deployed at the first level of the nested hierarchy to assign the first level transport requests present in each second level transport collection to the target systems present in the first level of the hierarchy.

First level 238 includes three hierarchies of system landscapes, for e.g. hierarchy of system landscapes 200A, hierarchy of system landscapes 200B and hierarchy of system landscapes 200C. Nested hierarchy of the system landscapes 244 includes hierarchies of system landscapes 200A, 200B and 200C.

Hierarchy of system landscapes 200A includes system landscapes 201A, 203A and 205A. Each of the system landscapes include source systems and target systems. For instance, system landscapes 201A, 203A and 205A include "source system 1" 204A, "source system 2" 208A, and "source system 3" 212A as source systems and "target system 1" 222A, "target system 2" 224A, and "target system 3" 226A as target systems. The source systems may be contained in source block 202A and the target systems may be contained in target block 220A. Similarly hierarchy of system landscapes 200B includes system landscapes 201B, 203B and 205B. Each of the system landscapes include source systems and target systems. For instance, system landscapes 201B, 203B and 205B include "source system 1" 204B, "source system 2" 208B, and "source system 3" 212B as source systems and "target system 1" 222B, "target system 2" 224B, and "target system 3" 226B as target systems. The source systems may be contained in source block 202B and the target systems may be contained in target block 220B. Hierarchy of system landscapes 200C includes system landscapes 201C, 203C and 205C. Each of the system landscapes include source systems and target systems. For instance, system landscapes 201C, 203C and 205C include "source system 1" 204C, "source system 2" 208C, and "source system 3" 212C as source systems and "target system 1" 222C, "target system 2" 224C, and "target system 3" 226C as target systems. The source systems may be contained in source block 202C and the target systems may be contained in target block 220C.

A transportation controller is operable for transporting object packets from the source blocks to the target blocks. These target blocks may be target blocks of the same hierarchy, target blocks of a different hierarchy or even source blocks of a different hierarchy that are operable to accept object packets from other source blocks. In an embodiment, the source blocks of a hierarchy that are operable to accept the object packets may utilize the object packets that are transported from the source blocks of another hierarchy to output object packets that is be further transported to target blocks in the nested hierarchy.

At second level 240, second level transportation controller 218A is operable for transporting object packets from source block 202A to the target systems present in nested hierarchy of the system landscapes 244. For instance, second level transportation controller 218A transports the object packets from source block 202A to target block 220A present in hierarchy of landscapes 200A. Second level transportation controller 218A may also be operable for transporting object packets from source block 202A to third level transport controller 230. Similarly, second level transportation controller 218B is operable for transporting object packets from source block 202B to the target systems present in nested hierarchy of the system landscapes 244. Second level transportation controller 218C is operable for transporting object packets from source block 202C to the target systems present in nested hierarchy of the system landscapes 244.

At first level 238, second level transportation controller 218A identifies the object packets available for transporting from each of the source systems 204A, 208A and 212A, to the target systems present in nested hierarchy of the system landscapes 244. Second level transportation controller 218A generates first level transport requests 206A, 210A and 214A respectively for each of the source systems 204A, 208A and 212A. Second level transportation controllers 218B and 218C perform the same steps for the respective source systems.

At second level 240, second level transportation controller 218A aggregates first level transport requests 206A, 210A and 214A to render second level transport collection 216A. Similarly, second level transportation controller 218B aggregates transport requests 206B, 210B and 214B to render second level transport collection 216B and second level transportation controller 218C aggregates first level transport requests 206C, 210C and 214C to render second level transport collection 216C. In an embodiment, second level transport controller 218A, 218B and 218C transport second level transport collections 216A, 216B and 216C to target block 220A, 220B and 220C respectively present in hierarchies 200A, 200B and 200C.

At third level 242, one or more second level transportation collections rendered at second level 240 are aggregated by third level transportation controller 230, to create third level transport collection 232. For instance, third level transport collection 232 includes second level transport collection 232A from second level transportation controller 216A, and similar second level transport collections 232B, 232C, 232D from their respective second level transportation controllers. Third level transportation controller 230 transports third level transport collection 232 to second level transportation controller 218B and 218C at 234 and 235 respectively.

Further, at second level 240, second level transportation controller 218B and 218C transports third level transport collection 232 to hierarchies 200B and 200C at 236 and 237 respectively. Second level transportation controller 218B and 218C may also deploy third level transport collection 232 at 236 and 237 and transport third level transport collection 232 to the corresponding target systems present in target block 220B and 220C respectively. In an embodiment, third level transport collection 232 in association with the second level transport collection rendered at second level 240 (e.g., 216B and 216C) may be transported to target blocks 220B and 220C. Second level transportation controller 218B and 218C may deploy the respective second level transport collections to assign the first level transport requests included in them to the respective target systems. At first level 238, the object packets included in the first level transport requests 206A, 210A and 214A are assigned to the respective target systems present in nested hierarchy of the system landscapes 244. The object packets transferred to the target block (e.g., 220B and 220C) of hierarchies 200B and 200C may have been transported from the source blocks of the respective hierarchies (e.g., 202B and 202C), or from the source systems of other hierarchies (e.g., 202A).

At first level 238, for hierarchy 200A, the source systems (e.g., 204A, 208A, 212A), may be development systems, and the target systems (e.g., 222A, 224A and 226A) may be quality assurance systems and/or production systems. The object packets that have to be transferred from the development systems are identified. The first level transport requests are generated for a collection of object packets for each development system. The first level transport requests are aggregated to render a second level transport collection. The second level transport collection is transported to the quality assurance systems and/or production systems.

However, from a higher level, for instance from second level 240, hierarchy 200A may be a source system or a development system, and hierarchies 200B and 200C may be the target systems or a quality assurance system and a production system respectively. To transport development data from development system 200A to quality assurance system 200B and production system 200C, transportation controller 218A of 200A generates transport collection 216A. The transport collection 216A is aggregated with one or more of other transport collections rendered at one or more hierarchies, to create principle transport collection 232, at third level 242. Principle transportation controller 230 transports principle transport collection 232 to transportation controllers 218B and 218C of quality assurance system 200B and production system 200C respectively. Transportation controllers 218B and 218C transport principle transport collection 232 to quality assurance system 200B and production system 200C respectively. Thus the target blocks of quality assurance system 200B and production system 200C may have object packets coming from development system 200A, apart from their own source blocks 202B and 202C respectively.

Thus, in nested hierarchy 244, including three hierarchies of system landscapes 200A, 200B and 200C, the transport collection is rendered recursively to transport object packets from source systems in hierarchy of system landscapes 200A to hierarchy of system landscapes 200B and hierarchy of system landscapes 200C. This method may be applicable to nested system landscapes including multiple hierarchies of system landscapes. For instance, the object packets available for transporting from the source systems to the target systems at an $n^{th}$ level of the nested hierarchy are identified. An $n^{th}$ level transport request is generated for a collection of object packets of each source system present in the $n^{th}$ level of the nested hierarchy. The $n^{th}$ level transport request is generated in a hierarchy that is identical to the nested hierarchy of the system landscapes. The $n^{th}$ level transport requests generated for all the source systems at the $n^{th}$ level of the nested hierarchy are aggregated to render an n+1 level transport collection at an n+1 level of the nested hierarchy. One or more such n+1 level transport collections that are rendered at n+1 level of the nested hierarchy are aggregated to generate an n+2 level transport collection at an n+2 level of the nested hierarchy. Thus a nested transport collection is created, including one or more transport collections rendered for a nested hierarchy of the system landscapes.

The n+2 level transport collection is transported to within the n+2 level of the nested hierarchy. The n+2 level transport collection is deployed at the n+1 level of the nested hierarchy, to assign the n+1 level transport collections present in the n+2 level transport collection to the corresponding hierarchies present in the nested hierarchy of system landscapes. Further, the n+1 level transport collections are deployed at the $n^{th}$ level of the nested hierarchy to assign the $n^{th}$ level transport requests present in each n+1 level transport collection to the target systems present in the $n^{th}$ level of the hierarchy.

By recursively rendering the transport collection, the object packets from source systems are transported to corresponding target systems that are present in any hierarchy of system landscapes in the nested hierarchy of the system landscapes. The above method of transporting object packets may be utilized across multiple levels in the nested hierarchical arrangement of source and target system.

Figure 3:
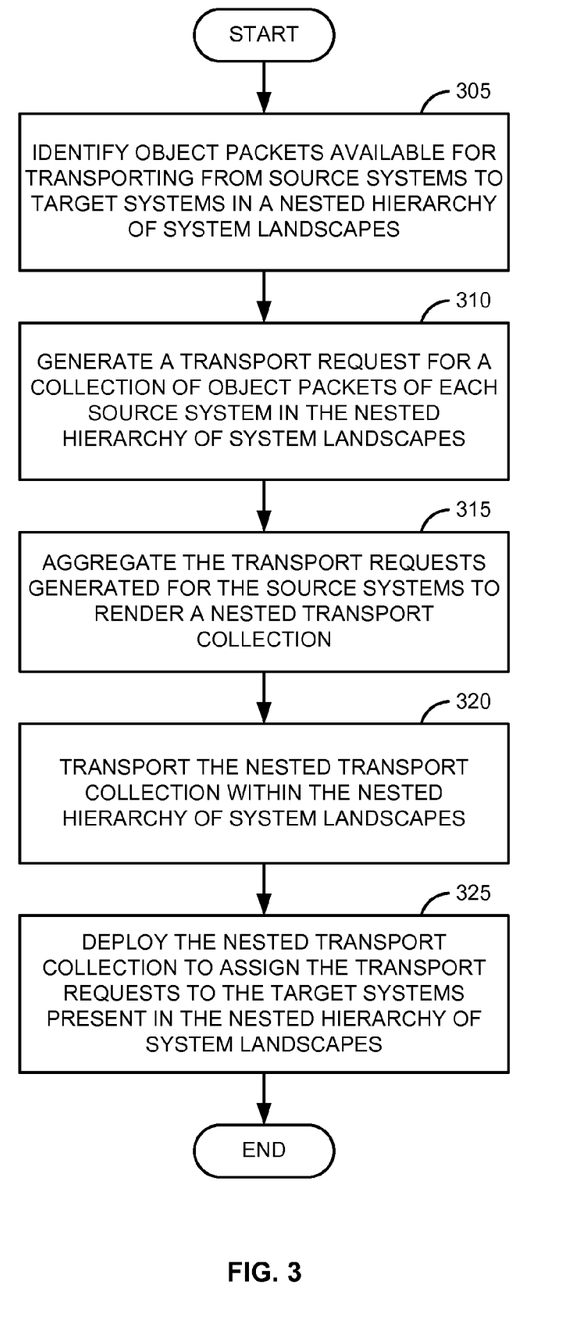
FIG. 3 is a flow diagram illustrating a process diagram for transporting one or more object packets present in a nested hierarchy of one or more system landscapes, according to an embodiment of the invention.

FIG. 3 illustrates a process diagram for transporting one or more object packets present in a nested hierarchy of one or more system landscapes, according to an embodiment of the invention. In process block 305, the object packets available for transporting from one or more source systems to one or more target systems present in the nested hierarchy of the system landscapes are identified. In process block 310, a transport request is generated for a collection of object packets of each source system present in the nested hierarchy of the system landscapes. The transport request represents a format of a type of output data included in the object packets it comprises. Transport requests are generated for all the source systems for the collection of object packets in the source systems. In process block 315, the transport requests generated for all source systems present in the hierarchy of system landscapes are aggregated to render a nested transport collection. The transport collection represents a format of a type of the object packets included in the transport request it comprises. In process block 320, the nested transport collection rendered for the source systems is transported within the nested hierarchy of the system landscapes. In process block 325, the nested transport collection is deployed to assign the transport requests included in the transport collection to the target systems present in the nested hierarchy of the system landscapes.

In an embodiment, the object packets available at the source systems of a primary level of a hierarchy of system landscapes are identified. The primary level of the hierarchy may include a group of source systems and a group of target systems. Primary level transport requests are generated for a collection of object packets for each of the source systems. The primary level transport requests are aggregated to render a secondary level transport collection at a secondary level of the hierarchy. The secondary level of the hierarchy may include one or more transport collections rendered for corresponding hierarchies of the system landscapes. All the secondary level transport collections are aggregated at a tertiary level of the hierarchy, to generate a tertiary level transport collection. The tertiary level transport collection is transported back to the secondary level. At the tertiary level, the tertiary level transport collection is transported within the nested hierarchy. At the secondary level, the tertiary level transport collection is deployed to assign the secondary level transport collections included in the tertiary level transport collection to the respective hierarchies. The secondary level transport collections are further transported to the respective target blocks and deployed at the primary level, to assign the target requests to the respective target systems. The object packets present in the transport requests are extracted by the target systems at the primary level of the nested hierarchy.

In an embodiment, the system landscape includes a development system, a quality assurance system and a production system. An output of the development system is transported to the quality assurance system and the production system. The development system may include a source system, and the quality assurance system and the production system may include a target system each. The output of the development system includes one or more object packets that have to be transported to the quality assurance system and the production system. The object packets available for transporting from one or more such development systems to one or more quality assurance systems and one or more production systems are identified. The development systems, the quality assurance systems and the production systems are present in a first hierarchy of the system landscapes. A transport request is generated for each collection of object packets from each development system. The transport requests are aggregated to render a transport collection. The transport collection is transported to the quality assurance system and production system, and deployed to assign the transport requests present in the transport collection to the respective quality assurance systems and the production systems.

In an embodiment, the transport request represents a request format that is identical to an object format of the object packets included in the transport requests. The transport collection represents a collection format that is identical to the request format of the aggregated transport requests.

In an embodiment, deploying the transport collection includes importing the transport collection at the target system (for e.g. quality assurance system or production system) and extracting the transport requests present in the transport collection for each target system. Further, the source systems associated with the transport requests are identified to determine the corresponding target systems. The object packets included in the transport requests are identified and assigned to the corresponding target systems.

In an embodiment, an index may be created for generating an identity for each source system and each target system. The identity may be described as an address of the system that shows an association it shares with other systems. For instance, the identity may provide an association between a source system and one or more target systems. This identity may be used to determine the target systems that correspond to the source systems. The index may create a mapping between the source systems and the corresponding target systems, to facilitate the determination of target systems that correspond to the source systems.

Figure 4:
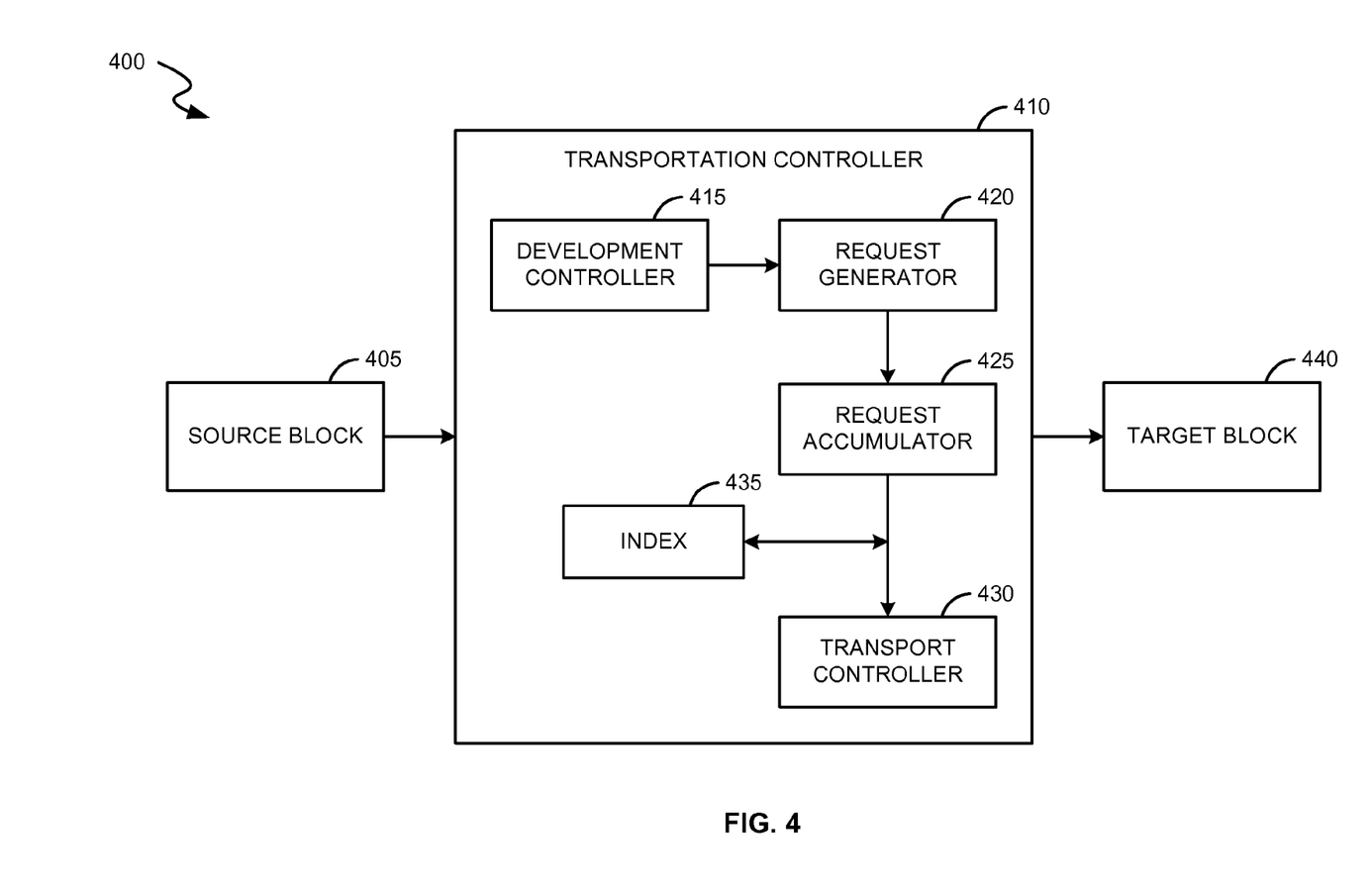
FIG. 4 illustrates a block diagram of a system for transporting one or more object packets present in a nested hierarchy of one or more system landscapes, according to an embodiment of the invention.

FIG. 4 illustrates a block diagram of a system for transporting one or more object packets present in a nested hierarchy of one or more system landscapes, according to an embodiment of the invention. Computer system 400 is utilized for analyzing the data within the data report. Some embodiments of the invention may include the above-described methods as being written as one or more software components. These components, and the functionality associated with them, represented as computer system 400 may include source block 405, transportation controller 410, development controller 415, request generator 420, request accumulator 425, transport controller 430, index 435 and target block 440. In an embodiment, development controller 415 is in communication with request generator 420. Request generator 420 is in communication with request accumulator 425 and index 435. Request accumulator 425 is in communication with transport controller 430. In an embodiment, development controller 415, request generator 420, request accumulator 425, transport controller 430 and index 435 are included in transportation controller 410. Transportation controller 410 is in communication with source block 405 and target block 440. In another embodiment, computer system 400 includes a processor operable for reading and executing instructions and a memory element for storing the instructions operable for transporting object packets from source systems to corresponding target systems.

The source systems and the target systems of a hierarchy of system landscapes may be collectively termed as source block 405 and target block 440 respectively. The source systems may be responsible for executing one or more processes to render a collection of output data. The output data may be required for further processing at target block 440. Transportation controller 410 transports the output data from source block 405 to target block 440.

For transporting the output data, transportation controller 410 employs development controller 415, request generator 420, request accumulator 425 and transport controller 430. Development controller 415 is operable for identifying object packets of each source system present in system block 405 of each hierarchy of system landscapes that is available for transporting to target systems present in target block 440 of the nested hierarchy of the system landscapes. An object packet is a collection of the output data that may result from one or more processes executed at a corresponding source system. The object packets may include output data of various applications that are associated with a corresponding source system. Request generator 420 is operable for generating a transport request for a collection of object packets at each source system in system block 405 present in the hierarchy of system landscapes. A transport request represents a collection of object packets that are available in a source system for transporting to one or more target system. Request generator 420 generates a transport request for each such collection of object packets in each source system present in source block 405 of the nested hierarchy of the system landscapes. Thus, an output of request generator 420 may include many transport requests, each representing a collection of object packets of one source system present in source block 405 of the hierarchy of system landscapes.

Request accumulator 425 is operable for aggregating the transport requests generated for the source systems, to render a transport collection. A transport collection represents a collection of transport requests that are generated for each collection of object packets available in each source system. Transport controller 430 is operable for transporting the transport collection to corresponding target systems present in the nested hierarchy of the system landscapes. In an embodiment, transport controller 430 is operable for transporting the transport collection to corresponding target systems present in a hierarchy of system landscapes same as the hierarchy of system landscapes in which the source systems are present. In another embodiment, transport controller 430 is operable for transporting the transport collection to corresponding target systems present in a hierarchy of system landscapes that is different from the hierarchy of system landscapes in which the source systems are present. In an embodiment, transport controller 430 is responsible for exporting the transport collection and deploying the transport collection at corresponding target systems.

Transport controller 430 is operable for deploying the transport collection at corresponding target systems present in the nested hierarchy of the system landscapes. Deploying the transport collection may include importing the transport collection rendered for the source systems, extracting the transport request present in the transport collection, identifying the source systems associated with each transport request, identifying the object packets available in each transport request, and assigning the object packets of each source system to a corresponding target system.

Index 435 in communication with transport controller 430 may store a transport directory that contains an identity of the source systems and the corresponding target systems. For instance, the transport directory includes an address AAAS of a source system and a corresponding address AAAT of a corresponding target system. The identity facilitates identification of a corresponding target system for every source system. Based upon the transport directory, transport controller 430 transports the transport collection to corresponding target systems.

In an embodiment, index 435 is operable to map the source systems and the corresponding target systems based upon the identity that exists in the transport directory. Mapping the source systems and the corresponding target systems includes identifying a corresponding target system for every source system, based upon an identity of the source system and the target system, and associating the corresponding target system with the source system. In an embodiment, index 435 generates an identity for each source system based upon the output data included in the transport requests of the transport collection rendered by request accumulator 425. Based upon the generated identity, a corresponding target system is identified. Based upon the identified target systems, transport controller 430 transports the transport collection and deploys the transport collections at the respective target systems.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include computer code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with computer readable software instructions.

Figure 5:
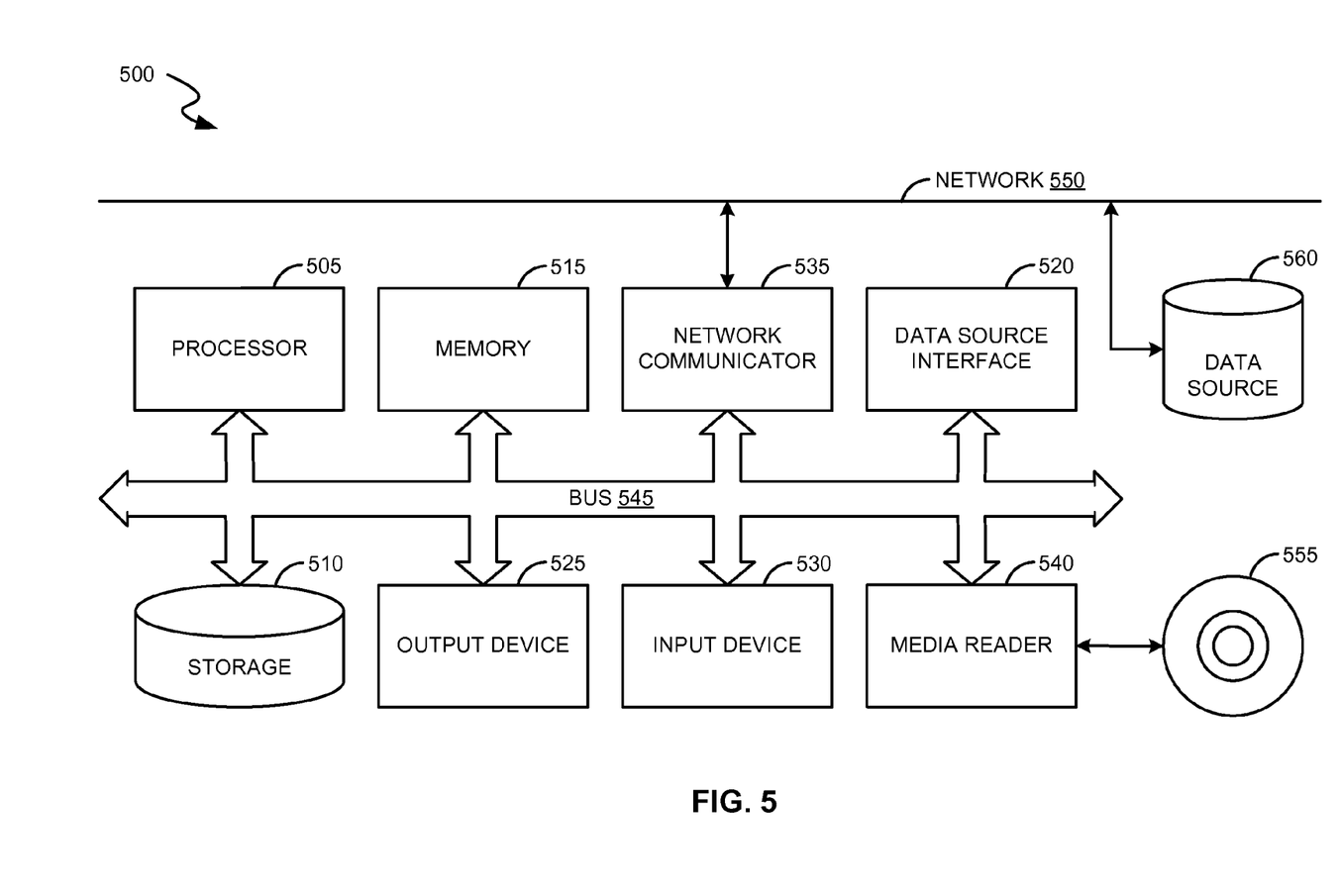
FIG. 5 illustrates a block diagram of an exemplary computer system and environment for implementing the principles and techniques discussed herein for transporting one or more object packets present in a nested hierarchy of one or more system landscapes, according to an embodiment of the invention.

FIG. 5 illustrates a block diagram of an exemplary computer system and environment for implementing the principles and techniques discussed herein for transporting one or more object packets present in a nested hierarchy of one or more system landscapes, according to an embodiment of the invention. Computing device 500 includes processor 510 that executes software instructions or code stored on computer readable medium 550 to perform the above-illustrated methods of the invention. Computing device 500 includes media reader 545 to read the instructions from computer readable medium 550 and store the instructions in storage 520 or memory or random access memory (RAM) 515. Storage 520 provides a large space for keeping static data where at least some instructions could be stored for later execution. The stored instructions may be further compiled to generate other representations of the instructions and dynamically stored in memory 515. Processor 510 reads instructions from memory 515 and performs actions as instructed.

According to one embodiment of the invention, computing device 500 further includes output device 525 (e.g., a display) to provide at least some of the results of the execution as output including, but not limited to, visual information to users and input device 530 to provide a user or another device with means for entering data and/or otherwise interact with computing device 500. Each of these output and input devices could be joined by one or more additional peripherals to further expand the capabilities of computing device 500. Network communicator 535 may be provided to connect computing device 500 to network 505 and in turn to other devices connected to network 505 including other clients, servers, data stores, and interfaces, for instance. The modules of computing device 500 are interconnected via system bus 560. Computing device 500 includes data source interface 540 to access data source 555. Data source 555 can be accessed via one or more abstraction layers implemented in hardware or software. For example, data source 555 may be accessed by network 505. In some embodiments, data source 555 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g. text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g. ERP system), and the like. Data sources may also include a data source where the data is not tangibly stored or otherwise ephemeral such as data streams, broadcast data, and the like. These data sources can include associated data foundations, semantic layers, management systems, security systems and so on.

In an embodiment, transporting object packets present in the hierarchy of system landscapes involves transporting object packets from the source systems of a hierarchy of system landscape to the corresponding target systems of the hierarchy of system landscape. In another embodiment, transporting object packets present in the hierarchy of system landscapes involves transporting object packets from source systems of a first hierarchy of system landscapes to corresponding target systems of a second hierarchy of system landscapes. The first and the second hierarchy of system landscapes are included in the nested hierarchy of the system landscapes.

The target systems that receive the object packets are present in the hierarchy of system landscapes whose structure is similar to the hierarchy of system landscapes that include the source systems that transport the object packets. Storage 520 may store metadata of the source systems and the corresponding target systems. The metadata stored in storage 520 may includes details about each source system and corresponding target system, like a type of data that each source system outputs, a type of development activity performed for each source system, identity of a corresponding target system for each source system, etc. In an embodiment, a group of source systems whose object packets are being transported may be selected from input device 530.

To transport the object packets from source systems to corresponding target systems, the object packets of each source system present in the nested hierarchy of the system landscapes are identified. For a collection of object packets of each source system present in the hierarchy of system landscapes that has to be transported to one or more corresponding target system present in the nested hierarchy of the system landscapes, a transport request is generated for each source system. The transport requests of all the source systems present in the hierarchy of system landscapes are aggregated to render a transport collection. In an embodiment, the transport collection may be rendered on output device 525. The transport collection rendered for the transport requests of the source systems present in the hierarchy of system landscapes is transported to the target systems present in the nested hierarchy of the system landscapes. In an embodiment, network communicator 535 may be utilized to transport the transport collection from the source systems to the corresponding target systems. The transport collections are deployed at the target systems present in the nested system landscapes, to assign the object packets contained in the transport requests at the respective target systems.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture, comprising a non-transitory computer-accessible medium comprising computer readable instructions which when executed by a computer, cause the computer to execute a method comprising:
- identifying one or more object packets for transporting from one or more source systems to one or more target systems, the one or more source systems and the one or more target systems being present in a nested hierarchy of one or more system landscapes associated with one or more system landscape processes;
- generating a transport request for a collection of one or more object packets of each of the one or more source systems present in the nested hierarchy of the one or more system landscapes;
- aggregating the transport requests generated for the source systems of each system landscape to render one or more corresponding nested transport collections in a nested aggregation hierarchy identical to the nested hierarchy of the system landscapes, the nested transport collections corresponding to the system landscape processes;
- transporting the nested transport collections from the source systems to the target systems within the nested hierarchy of the system landscapes; and
- deploying the nested transport collections to assign the transport requests present in the nested transport collections to the corresponding target systems present in the nested hierarchy of the one or more system landscapes.

2. The article of manufacture of claim 1, wherein the nested hierarchy of one or more system landscapes comprises one or more hierarchies of one or more system landscapes, each hierarchy including one or more system landscapes, each system landscape including one or more source systems and one or more target systems.

3. The article of manufacture of claim 1, wherein identifying the one or more object packets comprises identifying the one or more object packets available at the one or more source systems of a first level of a hierarchy of one or more system landscapes, the first level of the hierarchy of the one or more system landscapes including one or more source systems and corresponding one or more target systems.

4. The article of manufacture of claim 1, wherein aggregating the one or more transport requests comprises aggregating the one or more transport requests to render a transport collection at a second level of a hierarchy of one or more system landscapes, the second level of the hierarchy of the one or more system landscapes including one or more transport collections rendered for corresponding one or more hierarchies of the one or more system landscapes.

5. The article of manufacture of claim 1, wherein the method further comprises:
- identifying the one or more object packets available for transporting from the one or more source systems to the one or more target systems at a first level of the nested hierarchy of the one or more system landscapes;
- generating a first level transport request for a collection of one or more object packets of each of the one or more source systems present in the first level of the nested hierarchy of the one or more system landscapes;
- aggregating one or more first level transport requests generated for the one or more source systems at the first level of the nested hierarchy of the one or more system landscapes to render a second level transport collection at a second level of the nested hierarchy of the one or more system landscapes;
- aggregating one or more second level transport collections rendered at the second level of the nested hierarchy of the one or more system landscapes, to generate a third level transport collection at a third level of the nested hierarchy of the one or more system landscapes;
- transporting the third level transport collection within the third level of the nested hierarchy of the one or more system landscapes;
- deploying the third level transport collection at the third level of the nested hierarchy of the one or more system landscapes, to assign the one or more second level transport collections present in the third level transport collection to the second level of the nested hierarchy of the one or more system landscapes; and
- deploying the one or more second level transport collections at the second level of the nested hierarchy of the one or more system landscapes, to assign the one or more first level transport requests present in each of the one or more second level transport collections to the one or more target systems present in first level of nested hierarchy of the one or more system landscapes.

6. The article of manufacture of claim 5, wherein the second level of the nested hierarchy of the one or more system landscapes comprises:
- rendering one or more second level transport collections for one or more second level hierarchies present in the second level of the nested hierarchy of the one or more system landscape;
- aggregating the third level transport collection deployed at the one or more second level hierarchies present in the second level of the nested hierarchy of the one or more system landscapes with the one or more second level transport collections to generate an aggregated second level transport collection; and
- deploying the aggregated second level transport collection at the first level of the nested hierarchy of the one or more system landscapes.

7. The article of manufacture of claim 1, wherein transporting the transport collection comprises transporting the transport collection to one or more target systems corresponding to one or more source systems at a first level of a nested hierarchy of the one or more system landscapes.

8. The article of manufacture of claim 1, wherein transporting the transport collection comprises transporting the transport collection associated with one or more source systems of a first hierarchy of one or more system landscapes to one or more target systems present in a second hierarchy of one or more system landscapes.

9. The article of manufacture of claim 1, wherein transporting the one or more object packets further comprises transporting the one or more object packets from a source system of a first hierarchy of one or more system landscapes to a target system of the first hierarchy of the one or more system landscapes.

10. The article of manufacture of claim 1, wherein transporting the one or more object packets further comprises transporting the one or more object packets from a source system of a first hierarchy of one or more system landscapes to a target system of a second hierarchy of one or more system landscapes.

11. The article of manufacture of claim 1, wherein a system landscape comprises a development system, a quality assurance system, and a production system.

12. The article of manufacture of claim 11, wherein an output of the development system is transported to the quality assurance system and the production system, the development system comprising a source system, and the quality assurance system and the production system comprising corresponding one or more target systems, the output of the development system including one or more object packets of the development system.

13. The article of manufacture of claim 12, wherein the method further comprises:
- identifying the one or more object packets available for transporting from one or more development systems to one or more quality assurance systems and one or more production systems, the one or more development systems, the one or more quality assurance systems and the one or more production systems present in a first hierarchy of the one or more system landscapes;
- generating a transport request for a collection of one or more object packets of each of the one or more development systems;
- aggregating one or more transport requests generated for the one or more development systems to render a transport collection;
- transporting the transport collection to the one or more quality assurance systems and one or more production systems; and
- deploying the transport collection to assign the one or more transport requests present in the transport collection to the one or more quality assurance systems and the one or more production systems.

14. The article of manufacture of claim 1, wherein the transport request comprises a request format identical to an object format of the corresponding one or more object packets.

15. The article of manufacture of claim 1, wherein the transport collection comprises a collection format identical to a request format of the corresponding one or more aggregated transport requests.

16. The article of manufacture of claim 1, wherein deploying the transport collection comprises:
- importing the transport collection rendered for the one or more source systems to the second level of the nested hierarchy of the one or more system landscapes;
- at the first level of the nested hierarchy of the one or more system landscapes, extracting the one or more transport requests present in the transport collection for each of the corresponding one or more target system;
- at the first level of the nested hierarchy of the one or more system landscapes, identifying the one or more source systems associated with each of the one or more transport request;
- at the first level of the nested hierarchy of the one or more system landscapes, identifying the one or more object packets available in the transport request of each of the one or more source systems; and
- at the first level of the nested hierarchy of the one or more system landscapes, assigning the one or more object packets of each of the one or more source systems to the corresponding target system.

17. The article of manufacture of claim 1 wherein the method further comprises:
- creating an index for generating an identity for each of the one or more source systems and each of the one or more target systems and
- mapping the one or more source systems and the one or more target systems associated.

18. A computer implemented method for transporting one or more object packets present in a nested hierarchy of one or more system landscapes, comprising:
- identifying the object packets for transporting from one or more source systems to one or more target systems, the one or more source systems and the one or more target systems being present in the nested hierarchy of the one or more system landscapes associated with one or more system landscape processes;
- generating a transport request for a collection of one or more object packets of each of the one or more source systems present in the nested hierarchy of the one or more system landscapes;
- aggregating the transport requests generated for the source systems of each system landscape to render one or more nested transport collections in a nested aggregation hierarchy identical to the nested hierarchy of the one or more system landscapes, the nested transport collections corresponding to the system landscape processes;
- transporting the one or more nested transport collections from the source systems to the target systems within the nested hierarchy of the system landscapes; and
- deploying the nested transport collections to assign the transport requests present in the nested transport collections to the corresponding target systems present in the nested hierarchy of the one or more system landscapes.

19. A computing device operable for transporting one or more object packets present in a nested hierarchy of one or more system landscapes comprising:
- a processor operable for reading and executing instructions stored in one or more memory elements; and
- the one or more memory elements storing instructions for:
  - a development controller operable for identifying the one or more object packets available for transporting from one or more source system present in the hierarchy of one or more system landscapes to one or more corresponding target system present in a nested hierarchy of the one or more system landscapes, the nested hierarchy of the one or more system landscapes including the hierarchy of one or more system landscapes;
  - a request generator operable for generating a transport request for a collection of one or more object packets of each of the one or more source systems present in the nested hierarchy of the one or more system landscapes;
  - a request accumulator operable for aggregating the one or more transport requests generated for the one or more source systems to render a transport collection; and
  - a transport controller operable for transporting the transport collection rendered for the one or more source systems to the corresponding one or more target systems present in the nested hierarchy of the one or more system landscapes and deploying the transport collection to assign the one or more transport requests present in the transport collection to the corresponding one or more target systems.

20. The computing device of claim 19, further comprising an index operable for storing a transport directory, the transport directory including an identity of the one or more source systems and the corresponding one or more target systems and mapping the one or more source systems and the corresponding one or more target systems.

* * * * *